Sept. 5, 1961　　　K. SCHWENK　　　2,998,717
FLEXIBLE COUPLING DEVICE
Filed July 18, 1958　　　7 Sheets-Sheet 1

INVENTOR:
KURT SCHWENK

By *Clelle W. Upchurch* and
*Donald E. Tilth*

ATTORNEYS.

Sept. 5, 1961 K. SCHWENK 2,998,717
FLEXIBLE COUPLING DEVICE
Filed July 18, 1958 7 Sheets-Sheet 2

INVENTOR:
KURT SCHWENK

By

ATTORNEYS.

Sept. 5, 1961 K. SCHWENK 2,998,717
FLEXIBLE COUPLING DEVICE
Filed July 18, 1958 7 Sheets-Sheet 3

INVENTOR:
KURT SCHWENK
By
ATTORNEYS.

INVENTOR:
KURT SCHWENK

ATTORNEYS.

Sept. 5, 1961 K. SCHWENK 2,998,717
FLEXIBLE COUPLING DEVICE
Filed July 18, 1958 7 Sheets-Sheet 5

INVENTOR:
KURT SCHWENK

By

ATTORNEYS.

Sept. 5, 1961　　　　K. SCHWENK　　　　2,998,717
FLEXIBLE COUPLING DEVICE

Filed July 18, 1958　　　　　　　　　7 Sheets-Sheet 6

INVENTOR:
KURT SCHWENK

By

ATTORNEYS.

Sept. 5, 1961  K. SCHWENK  2,998,717
FLEXIBLE COUPLING DEVICE
Filed July 18, 1958  7 Sheets-Sheet 7

INVENTOR:
KURT SCHWENK

By

ATTORNEYS.

United States Patent Office 2,998,717
Patented Sept. 5, 1961

2,998,717
FLEXIBLE COUPLING DEVICE
Kurt Schwenk, Dusseldorf, Germany, assignor, by mesne assignments, to Mobay Chemical Company, Pittsburgh, Pa., a corporation of Delaware
Filed July 18, 1958, Ser. No. 749,484
Claims priority, application Germany July 30, 1957
11 Claims. (Cl. 64—13)

This invention relates generally to a flexible coupling device and more particularly to an improved coupling device for connecting power transmitting shafts together.

It has been proposed heretofore to provide flexible coupling devices for joining the ends of power-transmitting shafts together. These coupling devices usually consist of a planar textile reinforced rubber coupling to which is attached in a staggered fashion, a driving shaft on one side and a driven shaft on the other. These flexible coupling devices, known in the automobile industry as Hardy discs, are more or less severely deformed in bending the joint. This is because the stresses generated in bending the joint are unequally distributed over its cross-section since the bending stresses are highest at the point where the shafts are anchored. Furthermore, the torsional stresses, resulting from turning the driving shaft, are generally highest at the outer periphery of the disc body. By reason of these facts, only limited forces can be transmitted through thin and highly flexible disc couplings of the type heretofore known. It has, therefore, become necessary to use relatively thick couplings of the type previously known for the transmission of large forces. However, these relatively thick couplings are quite rigid and can only be used where minor bending deflection occurs. Accordingly, when substantial bending deflection was a desired characteristic, an oversized coupling, that is, one of relative large diameter, was necessary.

It is, therefore, an object of this invention to provide a flexible coupling device which, not only is capable of transmitting substantially larger forces than could heretofore be transmitted by such couplings of the same diameter, but is also able to accommodate larger bending deflections as a result of a higher elasticity. The above objects are realized according to the present invention by increasing the cross-section, continuously or discontinuously, of the coupling device from its center towards its periphery. Accordingly, the coupling device of the present invention is shaped in such a manner that the stresses, both bending and torsional, are substantially equally distributed over the cross-section by providing an appropriate thickness in cross-section from its center to its periphery. This cross-sectional thickness may often, depending upon the design criteria, result in a cross-section which increases from the center to the area of the anchor points, then decreases, and then increases to the periphery. Thus, the cross-section overall, is increased from the center area in two steps. It may also be desirable to increase the cross-section of the device from the center to the periphery in several steps, depending upon the design criteria. As a result of varying the thickness of the coupling device, the stresses are distributed substantially equally over the cross-section areas so that substantially larger forces can be transmitted and so that stresses, which occur as a result of bending the joint, will be equally distributed.

Often, in accordance with the present invention, it appears especially useful to provide both sides of the coupling device with radially disposed ribs originating from the center area towards the anchor points and to interconnect these ribs by a circular rib band for equal distribution of the stresses. These ribs and rib bands are made in one piece with the coupling. The purpose of the rib band is to absorb the stresses caused by the anchor points not coinciding with the center of gravity of the coupling's cross-section.

The shaped flexible shaft coupling device of this invention is cast from a substantially nonporous rubber-like polyurethane plastic, in which may be provided rigid cast-in place reinforcing elements. Any suitable substantially nonporous rubber-like polyurethane may be used to cast the coupling device provided by this invention, but best results are obtained when the polyurethane has a Shore A hardness of from about 60° to about 90° and an elasticity of from about 35% to about 60%.

Other objects will become apparent with the following detailed description of the invention and with reference to the accompanying drawings in which.

The rubber-like portion of the coupling device provided by this invention may be formed from any suitable substantially nonporous or homogeneous rubber-like polyurethane. For instance, the polyurethane may be prepared by reacting any suitable organic polyisocyanate with any suitable organic compound having reactive hydrogens and capable of reacting with the polyisocyanate to form a polyurethane. For example, 1,5-naphthylene diisocyanate, p-phenylene diisocyanate or 4,4'-diphenyl dimethylmethane diisocyanate may be reacted with a polyester, polyalkylene ether glycol, a polythioether glycol, or the like having terminal groups which are predominantly hydroxyl groups and a molecular weight of at least 750 and the resulting product may be cross-linked with an organic chain extender or cross-linker. Suitable cross-linking agents include ethylene glycol, diethylene glycol, butanediol, diprimary aliphatic and aromatic diamines, such as toluylene diamine, or the like, Indeed, any organic compound having reactive hydrogen atoms, organic polyisocyanate and cross-linker disclosed in U.S. Patents 2,729,618, 2,621,166, and 2,620,516 may be used in forming the polyurethane and any of the processes disclosed in these patents may be followed in making a polyurethane suitable for shaping the joint of this invention. Usually the coupling device will be formed by pouring a molten polyurethane in a suitable mold and about any metal parts to be embedded therein, and the contents of the mold will then be heated until cross-linking and curing has been obtained with solidification of the polyurethane into a relatively hard but flexible rubber-like substantially nonporous product having the shape of the mold.

It has been found that the coupling device provided by this invention is not adversely affected by prolonged exposure to weather or such materials as oil and the like. Furthermore, the coupling device will expand or contract uniformly with change in temperature without rupture to the joined shafts. The nonporous rubber-like polyurethane plastic is specially high abrasion resistant which guarantees a long service life for the flexible coupling device. A further advantage of the polyurethane is found in the fact that even coupling devices for extremely high forces with relatively large cross-sections can be used without any substantial loss in flexibility. In addition, the coupling device can be subdivided by slots parallel to the plane on the coupling device, which results in increased flexibility.

The flexibility may be increased through the addition to the polyurethane melt of activators such as alkylene salts, organic fatty acids, aryl, or alkyl sulphonates, respectively, and the reaction of the resulting isocyanate polyesters with mixtures of di- or polyfunctional cross-linkers. An important advantage of the nonporous rubber-like polyurethane as a material consists in the fact that in the molten stage it can be cast so that the coupling device with ribs, rib bands, holes and slots, rigid reinforcing elements, etc., can be cast in one piece. A specific design of a coupling device depends on whether it is more advantageous to distribute the tangential forces among more than two anchor points on each side, or whether it appears better to use only two anchor points on the device and increase the thickness of the device. The thicker cross-sections can be chosen because the distance between the anchor points is larger. In the case of coupling devices which are similar to universal joints and have only four anchor points; that is, two for the driving shaft and two for the driven shaft, it is possible to connect the anchor points by rigid elements. The rigid elements can consist of shaped sheet metal elements on the outside of the polyurethane body or of pins cast into the polyurethane.

Figure 1:
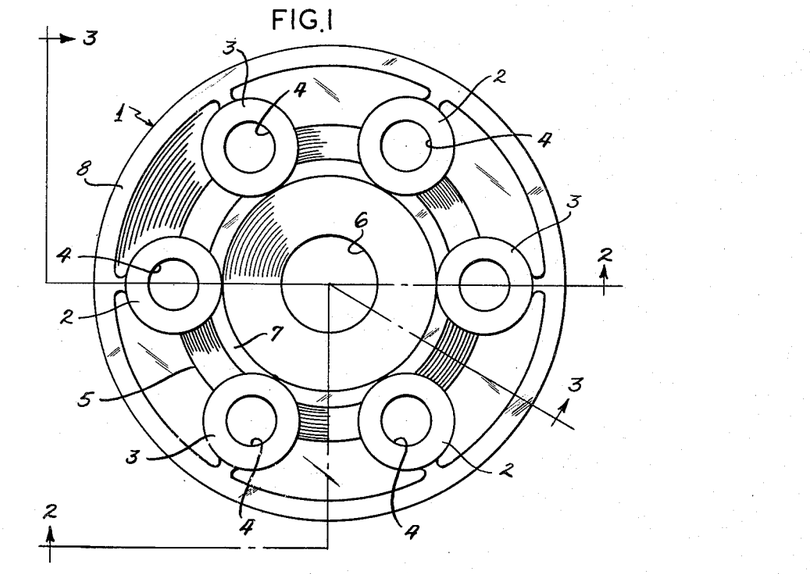
FIGURE 1 is a plan view of one embodiment of the invention in which three anchor points are provided for each of the two shafts to be joined.
Figure 2:
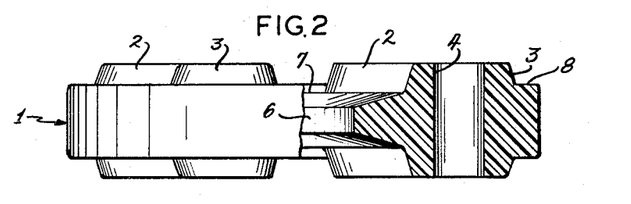
FIGURE 2 is a front elevation view, partially in section, taken in the direction of the arrow 2—2 in FIGURE 1.
Figure 3:
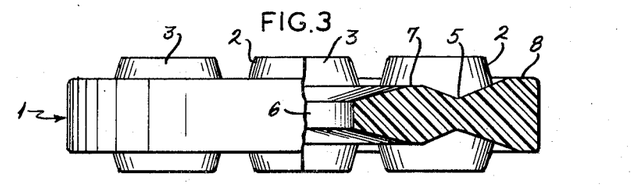
FIGURE 3 is a side elevation view of FIGURE 1 taken partially in section, along the lines 3—3 of FIGURE 1.

Referring again to the drawings for a more detailed description of the several embodiments. FIGURES 1 through 3 illustrate a flexible couping device 1 cast from a nonporous rubber-like polyurethane having a Shore A hardness of from about 60° to about 90° and an elasticity of from about 35% to about 60%. The device 1 is provided with three anchor points 2 for the driving shaft, and three anchor points 3 for the driven shaft. The anchor points display bolt-receiving holes 4 in the usual manner. As best shown by FIGURE 3, the cross-section of the coupling device increases from the central area towards the periphery in two steps. The depression as shown at 5, is on the radial centers of the bolt-receiving holes 4 and is the origin of the second step. Beginning at the central openings 6 in the coupling device, the thickness increases until 7. The thickness thereafter decreases towards the constriction or depression 5 and then increases again to the thickest point at 8. FIGURE 2 shows by the partial section taken along the lines 2—2 of FIGURE 1, the anchor points 2 or 3, and the bolt-receiving holes 4.

Figure 4:
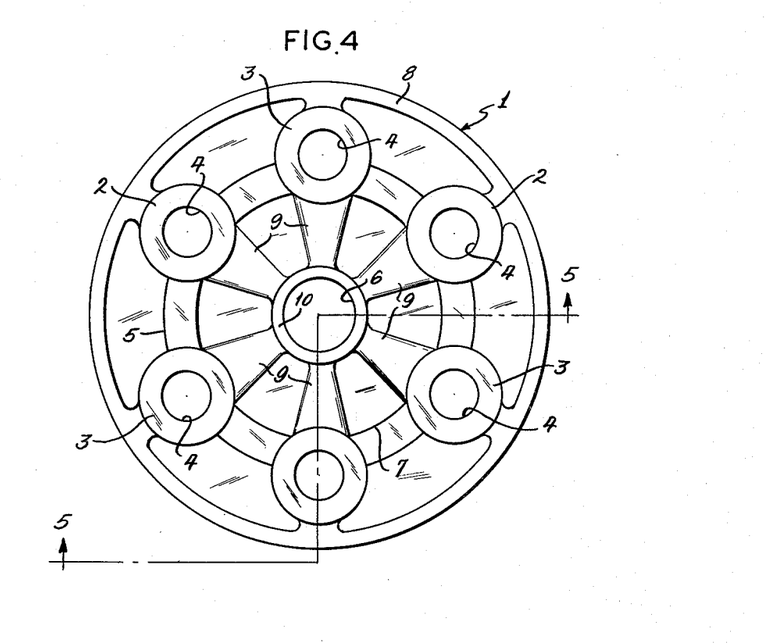
FIGURE 4 is a plan view illustrating yet another embodiment of the invention, wherein radial ribs and rib bands are provided.
Figure 5:
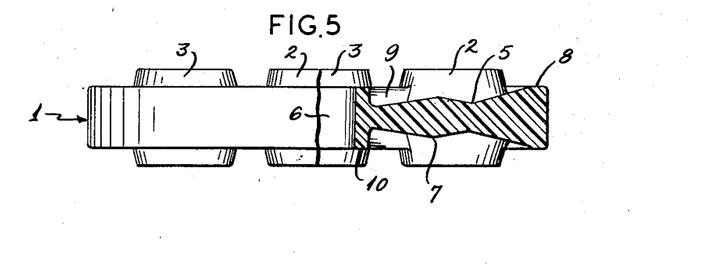
FIGURE 5 is a front elevation view, partially in section, taken along the lines 5—5 in FIGURE 4.
Figure 6:
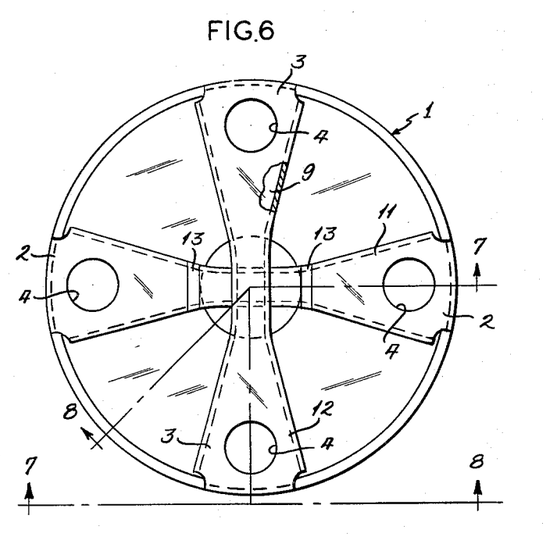
FIGURE 6 is a plan view of yet another embodiment of the invention, wherein corresponding anchor points are rigidly reinforced with shaped sheet metal elements.
Figure 7:
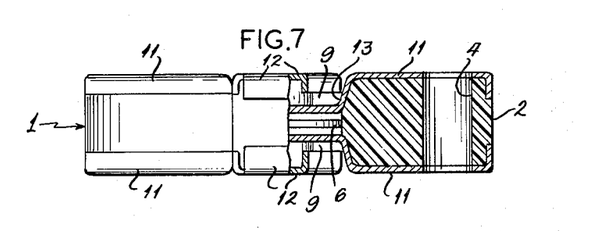
FIGURE 7 is a front elevation view taken partially in section, along the lines 7—7 of FIGURE 6.

FIGURES 4 and 5 illustrate a similar coupling device 1 which, however, displays radial ribs 9 originating from the central area toward the anchor points 2 and 3. The anchor points 2 and 3 are interconnected by a rib band 10. The ribs 9 divert the bending or compression stresses originating from both sides of the coupling device from the anchor points 2 and 3 from the direction of the central area and transfers the stress to the rib band 10.

Figure 8:
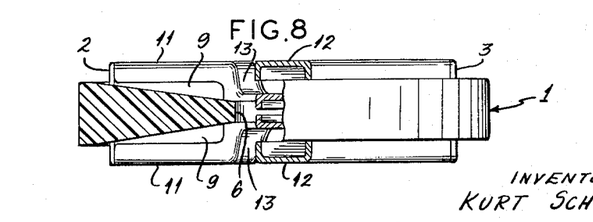
FIGURE 8 is a side elevation view, taken partially in section, along the lines 8—8 of FIGURE 6.

FIGURES 6 through 16 illustrate various embodiments for a coupling device having four anchor points; that is, two anchor points for the driving shaft and two anchor points for the driven shaft. In the embodiment shown in FIGURES 6 through 8, ribs 9 originate from the central area 6 outwardly towards the anchor points 2 and 3. These ribs are reinforced by pairs of shaped sheet metal strips 11 and 12, which connect corresponding anchor points; that is, one pair of shaped sheet metal strips will connect anchor points 2 and 2, whereas the other pair of shaped sheet metal strips will connect anchor points 3 and 3. The shaped sheet metal strips 11, which are located opposite each other, are provided with an offset 13 in the central area 6, so that the other pair of sheet metal strips 12 can be positioned thereover without the two pairs of rigid connecting elements contacting or interfering with each other. As best shown by FIGURE 8, in the partial-section, the cross-section of the coupling device illustrates a linear increase in the thickness of the device from the central area 6 towards the periphery.

Figure 9:
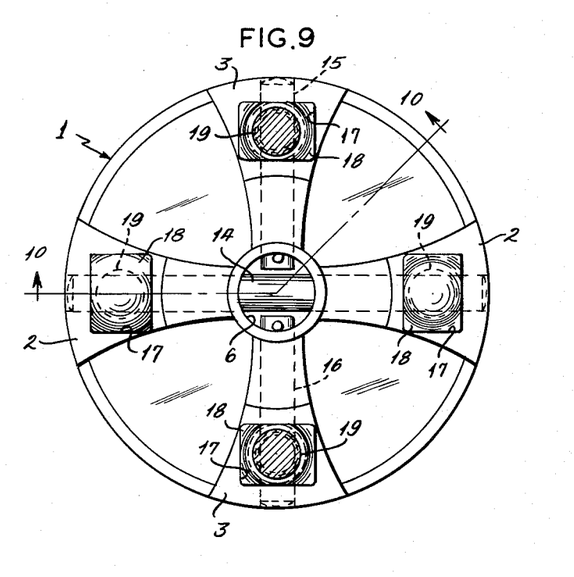
FIGURE 9 is a plan view of another embodiment of the invention, wherein cast in place pins or bolts are used to rigidly connect corresponding anchor points.
Figure 10:
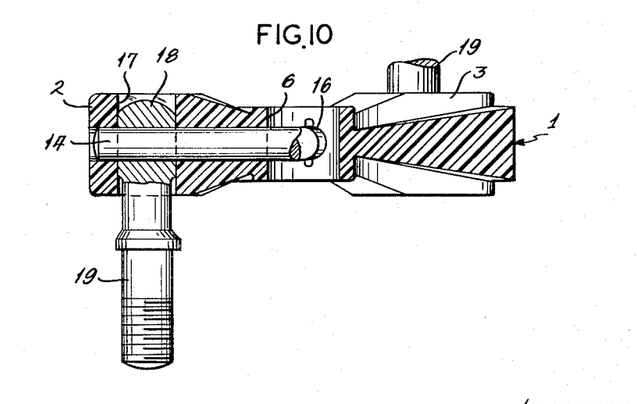
FIGURE 10 is a front elevation view, taken in section, along the lines 10—10 of FIGURE 9.

Bolts or pins 14, 15, and 16, are cast into the coupling device as shown in the embodiment illustrated in FIGURES 9 and 10. These bolts enable the anchor points to be moved as far as possible from the central area or axis. The anchor points 2, which belong to the driving shaft are connected by a single rigid bolt 14, while the anchor points 3 belonging to the driven shaft are reinforced by half-length bolts 15 and 16. These bolts 14 through 16 may be either cast into the polyurethane body or may be pressed into holes cast into the polyurethane body. In the latter instance, for example, eye-shaped anchors 18 are inserted into the opening 17 and then stand bolts 19 are attached to the anchors 18 at right angles to the plane of the flexible coupling device. When the bolts 14 through 16 are inserted, they penetrate through the anchors 18 and thus hold them in place.

Figure 11:
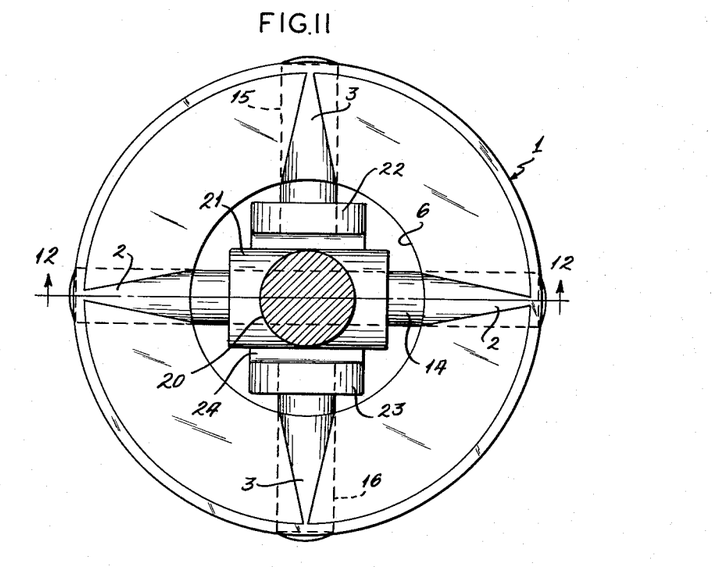
FIGURE 11 is a plan view of yet another embodiment of the invention having cast-in pins or bolts for rigidly reinforcing the anchor points.
Figure 12:
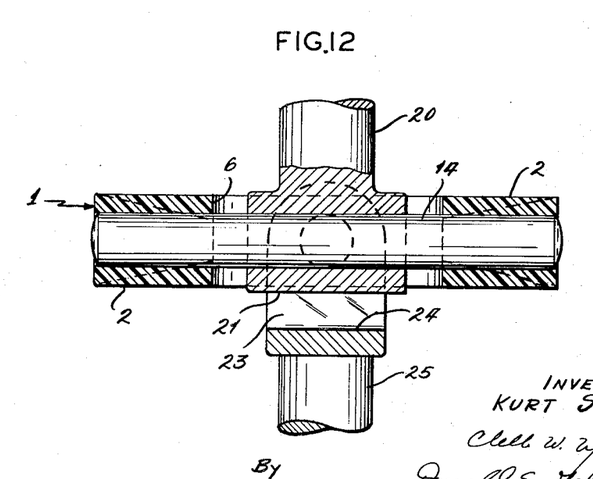
FIGURE 12 is a sectional view of FIGURE 11 taken along the lines 12—12.

According to the embodiment shown in FIGURES 11 and 12, the connection between the driving and driven shafts and the flexible coupling device is made in the area of the central opening 6. This is achieved by inserting pin or bolt 14 directly through the shaft end 20 of the driving side, which at this point is enlarged into substantially block form 21. The two pins 15 and 16 connect to arms 22 and 23 of the driven shaft 25 which at this point is fork-like. FIGURE 12 illustrates the change in cross-section of the coupling device with a dotted line.

Figure 13:
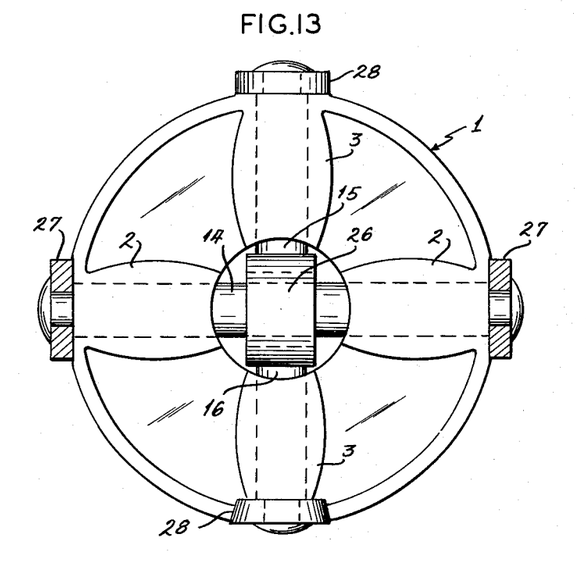
FIGURE 13 is a plan view of yet another embodiment of the invention for connecting forked-shaped flanges to the coupling device.
Figure 14:
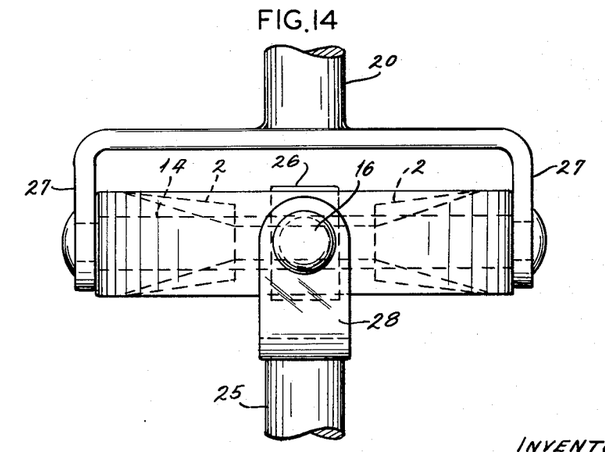
FIGURE 14 is a front elevation view of FIGURE 13.

According to the embodiment shown in FIGURES 13 and 14, the anchor points are located outside of the coupling device on the periphery thereof. The two pins or bolts 15 and 16 in this case are rigidly connected together by a ring element 26 which enables the long pin 14 to penetrate therethrough with enough clearance to prevent interference of the coupling device. The two shafts, that is, the driving shaft 20 and the driven shaft 25, are attached to the periphery of the coupling device through the ends of pins or bolts 14 through 16 by way of brackets 27 and 28 attached to their respective shafts. It should be noted that substantially the same connection can be achieved by the use of a bracket 28 substantially hidden in the outer periphery of the coupling device as shown in FIGURE 13.

Figure 15:
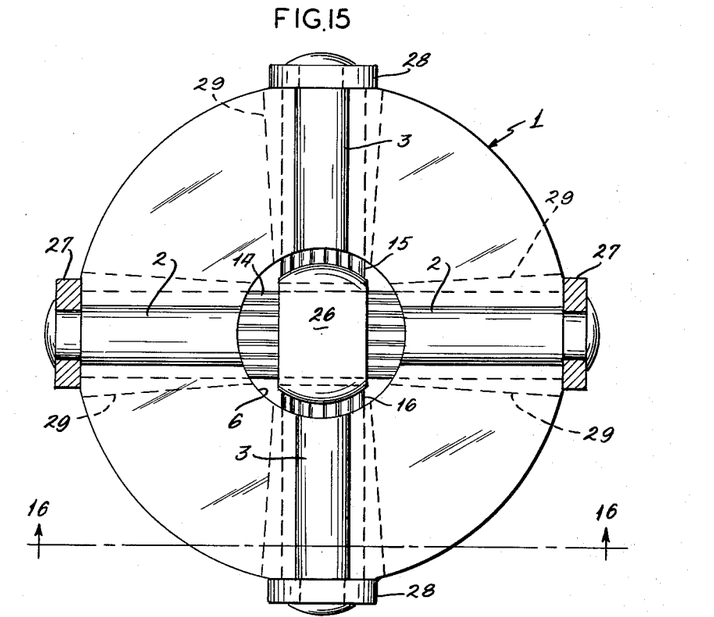
FIGURE 15 is a plan view of yet another embodiment of the invention similar to that shown in FIGURE 13.
Figure 16:
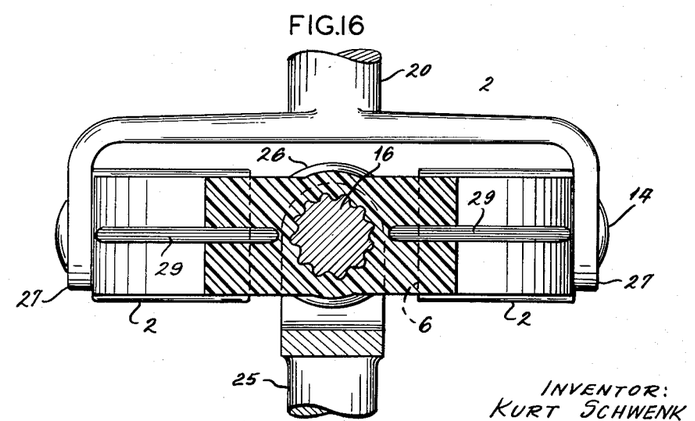
FIGURE 16 is a sectional view taken in the direction of the arrow 16—16 of FIGURE 15.

FIGURES 15 and 16 illustrate one method of increasing the elasticity of the flexible coupling device by providing subdivided slots 29 arranged parallel to the plane of the coupling device. Also the pins or bolts 14 through 16 may be profiled to prevent them from rotating inside the device, as best shown in FIGURE 16.

The following example illustrates the preparation of one polyurethane suitable for forming the coupling device provided by this invention:

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated to a temperature of about 135° C. and under a vacuum of about 12 mm. until the formation of bubbles has stopped and the polyester is completely free from water. Now, 180 parts by weight of naphthylene-1,5-diisocyanate are added at 135° C. to the dehydrated polyester while stirring. As soon as the temperature starts to drop, 20 parts by weight of butylene glycol-1,4 are stirred into the mixture at about 135° C. The resulting mixture is poured into a suitable mold. This has been so designed that any rigid element may be inserted in the mold in properly alined relation and the polyurethane is cast thereabout and solidified by curing. The above mixture is maintained in the mold at a temperature of about 110° C. for about 24 hours to form a homogeneous polyurethane rubber. After 24 hours the coupling device is removed from the heating chamber and the material then shows the following properties: The Shore A hardness 60°, resiliency 50%, elongation 500%.

It is to be understood that any suitable organic polyisocyanate, organic compound having reactive hydrogen atoms and cross-linking agent may be substituted for those in the foregoing example. Examples of these materials suitable for this purpose are found in the aforesaid patents. Moreover, it is to be understood that variations are permissible in the temperatures and processing steps insolong as the product obtained has the required physical characteristics.

As indicated hereinbefore, the molecular weight of the organic compound having reactive hydrogen atoms which is reacted with the organic polyisocyanate in the preparation of the polyurethane should be at least about 750. Although the chemistry involved in the preparation of the polyurethane is not specifically involved in this invention because any polyurethane having the required physical characteristics may be used to form the coupling device, it is considered advisable to point out that the polyester may be prepared by esterification of any suitable polycarboxylic acid, such as, for example, adipic acid, succinic acid, and the like. A desirable polyalkylene ether glycol may be prepared by the condensation of a lower alkenyl oxide, such as, for example, ethylene oxide, propylene oxide, butylene oxide, and the like.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A flexible coupling device for driven and driving shafts, comprising a rubber-like polyurethane body having a plurality of anchor points, the cross-sectional thickness of said body between said anchor points increasing continuously from the center towards the periphery, the cross-sectional thickness of said device at said anchor points being greater than the cross-sectional thickness at said periphery.

2. A flexible coupling device for driven and driving shafts, comprising a rubber-like polyurethane body having a plurality of anchor points, the cross-sectional thickness of said body between said anchor points increasing discontinuously from the center towards the periphery.

3. A flexible coupling device for driven and driving shafts, comprising a rubber-like polyurethane body having a plurality of anchor points and radially-disposed ribs therein, the cross-sectional thickness of said body between said ribs increasing from the center toward the periphery.

4. A flexible coupling device for the driven and driving shafts, comprising a shaped rubber-like polyurethane body having a plurality of anchor points, the cross-sectional thickness of said body between said anchor points increasing from the center toward the periphery, and shaped exterior sheet metal reinforcing and rigidizing strips connecting corresponding anchor points of said driving shaft and driven shaft, respectively, the cross-sectional thickness of said device at said anchor points being greater than the cross-sectional thickness at said periphery.

5. A flexible coupling device for driven and driving shafts, comprising a rubber-like polyurethane body, said body having a plurality of anchor points, the cross-sectional thickness of said body between said anchor points increasing from the center towards the periphery, the cross-sectional thickness of said device at said anchor points being greater than the cross-sectional thickness at said periphery.

6. A flexible coupling device with anchor points for driven and driving shafts according to claim 5 wherein the rubber-like polyurethane body has a rigid reinforcing element cast therein for connecting the anchor points for said driving shaft, and having a pair of reinforcing elements cast therein for said driven shaft.

7. A flexible coupling device with anchor points for driven and driving shafts according to claim 5 wherein the rubber-like polyurethane body has openings cast therein for inserting a rigid connecting element between the anchor points of the driving shaft and for inserting a pair of reinforcing elements for the anchor points of the driven shaft.

8. A flexible coupling device with anchor points for driven and driving shafts according to claim 5 wherein the rubber-like polyurethane body has cast therein rigid reinforcing elements connecting the anchor points for the driven shaft and the driving shaft, respectively.

9. A flexible coupling for connecting a driving shaft and a driven shaft comprising an annular body of polyurethane plastic, said body including a central portion, a peripheral portion, and a plurality of anchor points integral with said body, the cross-sectional thickness of said body between said anchor points increasing from said central portion to said peripheral portion, the cross-sectional thickness of said device at said anchor points being greater than the cross-sectional thickness at said periphery.

10. A flexible coupling for connecting a driving shaft and a driven shaft comprising an annular body of polyurethane plastic, said body including a central portion, a peripheral portion, and a plurality of anchor points integral with said body, a plurality of radially extending ribs integral with said body and intersecting said anchor points, the cross-sectional thickness of said body between said ribs increasing from said central portion to said peripheral portion.

11. A flexible coupling for connecting a driving shaft and a driven shaft comprising an annular body of polyurethane plastic, said body including a central portion, a peripheral portion, and a plurality of anchor points integral with said body, radially disposed ribs intersecting said anchor points, the cross-sectional thickness of said body between said ribs increasing from said central portion to said peripheral portion, said body having sheet metal reinforcing and rigidizing strips connecting corresponding anchor points.

(References on following page)

References Cited in the file of this patent

UNITED STATES PATENTS

| | | |
|---|---|---|
| 1,233,173 | Blair | July 10, 1917 |
| 1,409,611 | Stokes | Mar. 14, 1922 |
| 1,482,570 | MacDonald | Feb. 5, 1924 |
| 1,530,800 | Wilson | Mar. 24, 1925 |
| 1,611,954 | Schell | Dec. 28, 1926 |
| 2,051,442 | Geyer | Aug. 18, 1936 |
| 2,449,654 | Jessop | Sept. 21, 1948 |
| 2,504,750 | Strachousky | Apr. 18, 1950 |
| 2,659,218 | Riopelle | Nov. 17, 1953 |
| 2,764,002 | Wells | Sept. 25, 1956 |
| 2,913,884 | Pfeifer | Nov. 24, 1959 |

FOREIGN PATENTS

| | | |
|---|---|---|
| 252,529 | Great Britain | June 3, 1926 |
| 314,638 | Italy | Feb. 1, 1934 |